United States Patent [19]

Eriksson

[11] Patent Number: 5,212,689
[45] Date of Patent: May 18, 1993

[54] METHOD OF TRANSMITTING DIFFERENT COMMANDS RELATING TO THE CHOICE OF TRANSMITTER ANTENNA IN A TIME MULTIPLEX RADIO COMMUNICATIONS SYSTEM

[75] Inventor: Hakan O. Eriksson, Vallentuna, Sweden

[73] Assignee: Telefonaktiebolaget L M Ericsson, Stockholm, Sweden

[21] Appl. No.: 695,339

[22] Filed: May 3, 1991

[30] Foreign Application Priority Data

May 10, 1990 [SE] Sweden .................................. 9001700

[51] Int. Cl.$^5$ .............................................. H04B 7/06
[52] U.S. Cl. ..................... 370/106; 370/95.1; 370/105.4; 375/114; 375/116; 455/10; 455/52.1; 455/52.2; 455/52.3; 455/101
[58] Field of Search .............. 370/105.4, 106, 95.1; 375/114, 116; 455/52.1, 52.2, 52.3, 10, 101

[56] References Cited

U.S. PATENT DOCUMENTS

| | | |
|---|---|---|
| 3,693,088 | 9/1972 | Rustako, Jr. et al. .................. 325/56 |
| 4,599,734 | 7/1986 | Yamamoto ........................... 455/101 |
| 4,710,944 | 12/1987 | Nossen .............................. 375/100 X |
| 5,054,035 | 10/1991 | Tarallo et al. .................... 375/114 X |

FOREIGN PATENT DOCUMENTS 0158327 4/1985 European Pat. Off. .
0288904 4/1988 European Pat. Off. .

Primary Examiner—Douglas W. Olms
Assistant Examiner—Russell W. Blum
Attorney, Agent, or Firm—Burns, Doane, Swecker & Mathis

[57] ABSTRACT

The invention relates to a method for transmitting in a time multiplex radio communication system, for instance, a GSM-type mobile telephony system, different commands from a movable station to a fixed station with respect to the selection of transmitter antenna in the fixed station. Each transmission sequence from the movable station includes a synchronizing word which consists of a predetermined number of binary bits. The different commands are transmitted by using different synchronizing words in dependence on the command to be transmitted. The movable station has access to at least two different synchronizing words. The synchronizing words used in addition to a standard synchronizing word are formed by the binary bits from the standard synchronizing word being shifted laterally to mutually different extents and/or in mutually different directions in order to generate different, new synchronizing words. In this way, there is formed in the receiver of the fixed station an impulse response having a pulse which occurs at different time points depending on which synchronizing word was used by the movable station.

10 Claims, 2 Drawing Sheets

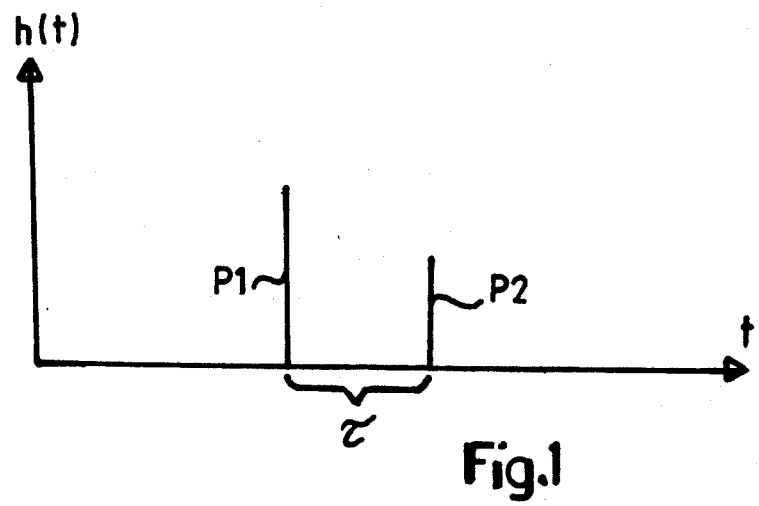
Fig.1
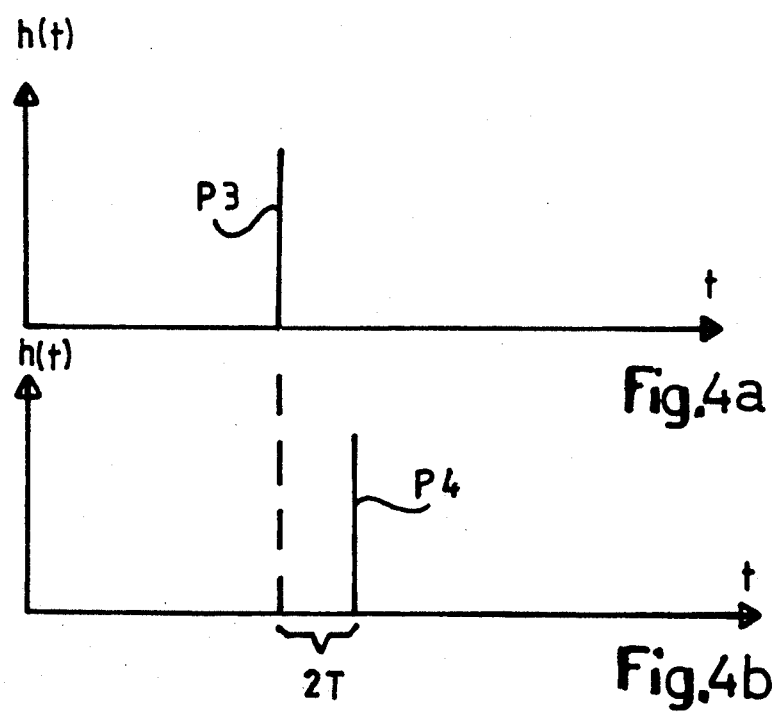
Fig.4a
Fig.4b

METHOD OF TRANSMITTING DIFFERENT COMMANDS RELATING TO THE CHOICE OF TRANSMITTER ANTENNA IN A TIME MULTIPLEX RADIO COMMUNICATIONS SYSTEM

FIELD OF THE INVENTION

The present invention relates to a method for transmitting in a time multiplex radio communication system different commands from a movable station to a fixed station concerning the selection of a transmitter antenna in the fixed station, wherein each transmission sequence from the movable station includes a synchronizing word consisting of a predetermined number of binary bits. The invention can be applied, for instance, in a GSM-type mobile telephony system.

BACKGROUND OF THE INVENTION

In a mobile telephony system with diversity reception in the base stations, each base station is equipped with two, or more than two antennas. In the reception mode, signals received from different antennas are added together in an appropriate manner, or optionally only the strongest signal at that time is chosen. Variations in the strengths of the received signals are caused by fading which in mobile telephony systems is caused by reflections of the transmitted radio signals, these reflections changing in time as the mobile station moves. For instance, when the base station is equipped with two antennas, the signal received on the one antenna may be of good quality whereas the signal received on the other antenna is of poor quality as a result of fading, whereas moments later the quality of signal reception on respective antennas may be the reverse.

When transmitting from the base station to the mobile station, it would be beneficial to transmit sometimes on the one antenna and sometimes on the other antenna, depending on which antenna produces the best received signal in the mobile station at that moment in time. Consequently, it is desirable to transmit from the mobile to the base station commands which are concerned with the selection of transmitter antenna in the base station. One problem in this regard, however, is that each transmission sequence (burst) in a time multiplex mobile telephony system of the GSM-type, for instance, already a predetermined content consisting of data bits and a synchronizing word.

SUMMARY OF THE INVENTION

The object of the present invention is to provide a method of transmitting different commands from the mobile station with regard to antenna selection in the fixed station without using those data bits intended for normal data transmission. This is achieved by altering the synchronizing word included in each transmission sequence upon request for a change of transmitter antenna. This invoices the use of different synchronizing words in dependence on desired commands. The synchronizing words used in addition to a standard synchronizing word are formed by shifting the binary bits from the standard synchronizing word laterally to different extents so as to obtain different, new synchronizing words. In this way, the receiver in the fixed station will receive an impulse response which includes a pulse that occurs at different time points in dependence on the synchronizing word used in by the mobile station. This method is particularly suitable for radio communication systems of small time dispersion, since any long-delay reflexes that occur will then be relatively weak.

BRIEF DESCRIPTION OF THE DRAWINGS

The invention will now be described in more detail with reference to the accompanying drawings, in which FIG. 1 illustrates an example of an impulse response formed in a base station of a mobile telephony system;

FIGS. 4a and 4b illustrate examples of two different impulse responses formed in a base station as a result of receiving two different synchronizing words.

BEST MODE OF CARRYING OUT THE INVENTION

Normally, one relevant impulse response is formed in the base station of a mobile telephony system for each transmission sequence received from a mobile station. This is achieved by comparing a fixed synchronizing word with a received bit sequence in a correlator. For instance, if the base station receives from the mobile station a direct signal and a reflected signal, the impulse response will contain two pulses. FIG. 1 illustrates an example of one such impulse response, designated h(t) in the Figure. The first pulse, P1, is the strongest pulse and derives from the direct signal, whereas the second pulse, P2, derives from the reflected signal and occurs with a time delay $\tau$ compared with the first signal. It is assumed herewith that the reflected signal has arrived at the receiver $\tau$ seconds after the direct signal.

The time dispersion is small in a mobile telephony system which comprises relatively small cells, and consequently reflected signals with long time delays are weak in comparison with the direct signal. One example of such a system is the PCN-system, Personal Communication Network, which can be based on the GSM-system and which may comprise cells of about 100 meters in diameter. In the GSM-system, the bit rate is 270 kbit/s, which means that a reflected signal delayed by one bit in comparison with the direct signal has travelled about 1 km further than the direct signal. Consequently, if each cell is about 100 m long, the distance travelled by a reflected signal having a time delay corresponding to 1 bit will be about 10 times longer than the distance travelled by the direct signal. The direct signal will therefore, on average, be more than 1000 times stronger than the reflected signal. Consequently, in a system having small time dispersion, the impulse response will, in practice, contain solely one pulse, since the reflected signals are missing in practice.

In the GSM-system, a normal transmission sequence includes a first part with data bits, a second part with a 26-bit synchronizing word, and a third part with data bits. The purpose of the synchronizing word is normally to synchronize the receiver with the transmitter and to form a channel estimate for equalization. No equalization is required in a small-cell system and thus a system with small time dispersion, since data bits from the direct signal and data bits from reflected signals will not be intermixed. Probably, no equalization is required when the time dispersion is smaller than about $10^{-6}$ s, which corresponds approximately to $\frac{1}{4}$ bit time. If a mobile telephony system constructed for cells where the time dispersion is of a given magnitude is used in small cells where the time dispersion is much smaller, it is therefore possible to transmit information with the aid of different, appropriately formed synchronizing words.

Figure 2:
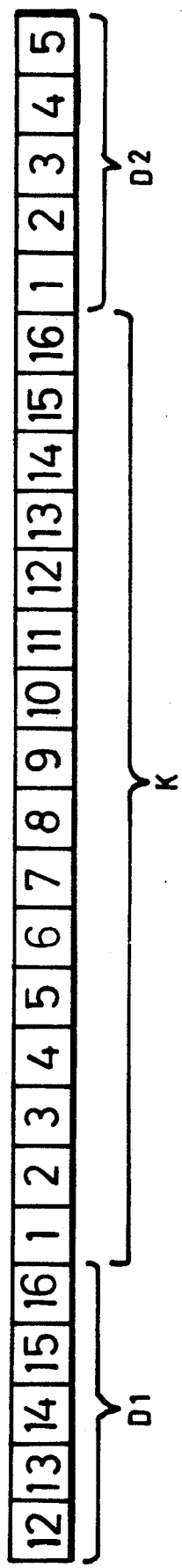
FIGS. 2 and 3 illustrate examples of synchronizing words in a mobile telephony system.

FIG. 2 illustrates the structure of a 26-bit synchronizing word in GSM. The word includes a central part K, the so-called core, containing 16 bits referenced by numerals 1–16. The five bits 12–16 furthest to the right in the core are also present in a part D1 which contains five bits and which lies to the left of the core, and the five bits 1–5 furthest to the left are also present in a part D2 which lies to the right of the core.

When a 26-bit synchronizing word is received, the word is compared in the receiver with a fixed 16-bit sequence which coincides with the 16 bits in the core of the synchronizing word. The bit stream received is compared bit by bit with the fixed bit sequence of the receiver. Two mutually equal bits located opposite one another give a plus point while two mutually different bits give a minus point. Thus, 16 plus points are obtained when the core in the received synchronizing word lies opposite the fixed bit sequence of the receiver. A pulse is then formed in the impulse response formed by the receiver. The synchronizing word in GSM is constructed in a manner such that the number of plus points will coincide with the number of minus points when the received synchronizing word deviates timewise with a maximum of five bit times from the time at which the core lies opposite the fixed bit sequence of the receiver. This means that the direct signal from the transmitter to the receiver will not contribute towards any pulse in the impulse response for as long as the received synchronizing word has an error of one to five bit times.

Figure 3:
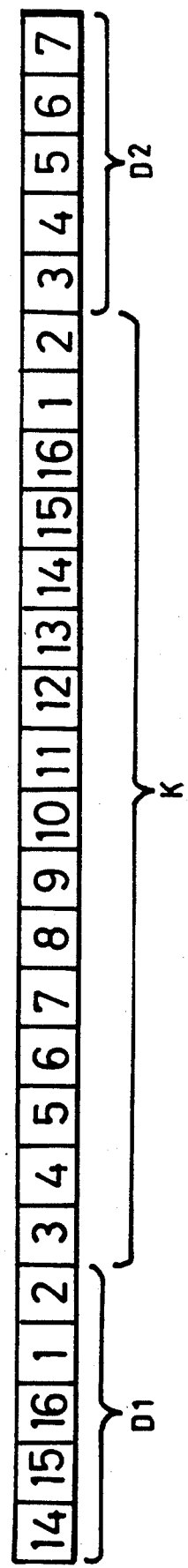

FIG. 3 illustrates an example of a synchronizing word different to that illustrated in FIG. 2. The 16 bits in the core K are shifted cyclically two steps to the left in comparison with the synchronizing word illustrated in FIG. 2. Consequently, the bits in the parts D1 and D2 have also been changed in relation to the synchronizing word illustrated in FIG. 2. The synchronizing word illustrated in FIG. 3 gives rise to a pulse in the impulse response formed by a receiver which occurs two bit-times later than the pulse generated by the synchronizing word illustrated in FIG. 2. It is assumed in this case that the synchronizing word is read from right to left in the transmission process.

FIGS. 4a and 4b illustrate two different impulse responses, of which the response shown in FIG. 4b contains a pulse P4 which occurs two bit-times, 2T, later than a pulse P3 in the impulse response illustrated in FIG. 4a.

According to the present invention, different synchronizing words are used for transmitting different commands from a mobile station concerning the selection of a transmitter antenna in a fixed station. For instance, if the synchronizing word illustrated in FIG. 2 is used in the standard case and this word is suddenly replaced by the synchronizing word shown in FIG. 3, in which the bits have been shifted two steps, the effect in the receiver, i.e. the fixed station, would be the same as though the mobile had been moved suddenly through a considerable distance. In accordance with the aforegoing, in a GSM-system this would correspond to a movement of about 2 km, which would be unreasonable. If it is assumed that the time dispersion is sufficiently small for the impulse response to contain solely one single pulse, two different synchronizing words in accordance with the aforegoing can therefore each correspond to a respective command to the fixed station. It is assumed in the following that the synchronizing word illustrated in FIG. 2 is the word used in standard cases, since the core of this word has not been shifted cyclically. Consequently, this word is referred to in the following as "the standard synchronizing word".

The command represented by the use of one or the other of said synchronizing words can be predetermined. For instance, the use of the standard word illustrated in FIG. 2 may be said to signify that the base station in the next transmission sequence to the mobile station concerned shall transmit on the same antenna as that on which the preceding transmission sequence to the mobile station was transmitted, whereas the use of the new, shifted word illustrated in FIG. 3 can be said to signify that the base station shall change antennas. In this instance, it is necessary for the mobile station to again use the standard synchronizing word during its next transmission sequence, since the base station would otherwise change antenna for each new transmission sequence to the mobile station concerned. It can also be decided that the use of the standard synchronizing word will signify that the base shall transmit on a given antenna, e.g. on the antenna 1 when the antennas are referenced antenna 1 and antenna 2, while the use of the other synchronizing word can signify that the base shall transmit on the other antenna, i.e. on antenna 2. In this instance, the mobile will, of course, not change back to the standard synchronizing word in the next transmission sequence.

In this latter case, i.e. when the mobile continues to use the cyclically shifted synchronizing word, it is necessary to effect a timewise compensation in the base station in order to prevent an error in the timewise synchronization.

It will be understood that the cyclic shift of the standard synchronizing word two bits to the right described with reference to FIGS. 2 and 3 has been given solely by way of example. Naturally, it is conceivable to shift the bits through a number of steps other than two instead. The bits in the standard synchronizing word may also be shifted to the right instead of to the left, wherewith the pulse will occur earlier rather than later. A synchronizing word of the aforedescribed kind, however, should not be shifted more than five steps, since otherwise the 16 bits would not occur sequentially in the order of 1 to 16 (in practice 16 to 1).

It is also conceivable to equip the base station with three, or more than three antennas from which transmissions can be made. In the case of three antennas, three different synchronizing words are preferably used, in dependence on which antenna in the base station is indicated by the mobile station. In this case, two synchronizing words are used in addition to the standard synchronizing word, these additional words being shifted in different ways, for instance through a different number of bit-steps or in respective directions.

The present invention may also be applied in systems other than GSM. For instance, it is not necessary for the synchronizing words to contain parts D1 and D2 which include bits that are also found in the core. In this case, however, the pulse in the impulse response will not be as high as the pulse in the illustrated example. Neither is it necessary to shift the bits cyclically, since they can be replaced at one end of the word by bits other than those which were shifted out at the other end.

The present invention may also be applied in radio communication systems other than a mobile telephony system, this system having been described by way of example only. Neither is it necessary for the antennas in the fixed station to be used for diversity reception.

The invention has been described in terms of specific embodiments to facilitate understanding. The above embodiments, however, are illustrative rather than limitative. It will be readily apparent to one of ordinary skill in the art that departures may be made from the specific embodiments shown above without departing from the essential spirit and scope of the invention. Therefore, the invention should not be regarded as being limited to the above examples, but should be regarded instead of being fully commensurate in scope with the following claims.

What is claimed is:

1. A method for transmitting, from a movable station to a fixed station in a time multiplex radio communication system, different commands concerning a selection of transmitter antenna in the fixed station, wherein the commands are transmitted in transmission sequences and each transmission sequence from the movable station includes a synchronizing word consisting of a predetermined number of binary bits, the method comprising the steps of: in the movable station, for each transmission sequence, alternatively accessing, based on a desired command to be transmitted, one of at least two different synchronizing words, each of which represents a respective command of said different command, each of the different synchronizing words being formed by laterally shifting its bits in relation to corresponding bits contained in each other synchronizing word; and transmitting the accessed synchronizing word to the fixed station as part of the transmission sequence.

2. A method according to claim 1, wherein each of the different synchronizing words is formed by cyclically shifting its bits in relation to the corresponding bits contained in other synchronizing words.

3. A method according to claim 1, wherein said radio communication system is a time multiplex mobile telephony system, and each synchronizing word comprises a beginning part, a central part, and a final part, the central part including first and second end parts, final parts of the synchronizing word replicating, respectively, the first and second end parts of the central part; and each of said different synchronizing words is formed by cyclically shifting the bits in the central part in relation to the corresponding bits contained in other synchronizing words.

4. A method according to claim 1, wherein each of said different commands signifies that transmission from the fixed station shall take place on an antenna indicated by each of said different commands.

5. A method according to claim 1, wherein the movable station alternatively accesses one of two different synchronizing words of which a first word represents a command signifying that the fixed station shall transmit a next transmission sequence to the movable station on an antenna used for transmission of an immediately preceding transmission sequence to the movable station and of which a second synchronizing word represents a command which signifies that the fixed station, during transmission of a next transmission sequence to the movable station, shall transmit on an antenna different from the antenna used to transmit an immediately preceding transmission sequence to the movable station.

6. A method for transmitting in a time multiplex radio communication system different commands from at least one movable station to a fixed station, each transmission sequence from said mobile station having a standard synchronizing word including a predetermined number of binary bits, comprising:

(a) generating a plurality of different synchronizing words, corresponding respectively to one of said different commands, by shifting the bits of said standard synchronizing word;

(b) transmitting one of said different synchronizing words for each new transmission sequence from said movable station depending on the particular command to be transmitted; and (c) selecting one of a plurality of antennas at said fixed station based on said different synchronizing word transmitted in step (b).

7. The method according to claim 6, wherein the bits of each of said different synchronizing words is shifted cyclically with respect to the bits in each of the remaining different synchronizing words.

8. A method according to claim 6, wherein said radio communication system is a time multiplex mobile telephone system and each of said different synchronizing words includes a central portion of bits, where initial bits of said central portion are repeated immediately after the end of said central portion and the final bits of said central portion are repeated immediately before the beginning of said central portion, said different synchronizing words being generated in step (a) so that the bits in said central portion are shifted cyclically.

9. A method according to claim 6, wherein each different command indicates that transmission from said fixed station shall take place on an antenna indicated by each command.

10. A method according to claim 6, wherein said movable station generates one of two different synchronizing words of which a first word represents a command indicating that said fixed station shall transmit a next transmission sequence to said movable station on an antenna used for an immediately preceding transmission sequence to said movable station and of which a second synchronizing word represents a command which indicates that said fixed station, during a next transmission sequence to said movable station, shall transmit on an antenna different from the antenna used to transmit an immediately preceding transmission sequence to said movable station.

* * * * *